United States Patent
Wiedemeier et al.

(10) Patent No.: US 11,607,788 B2
(45) Date of Patent: Mar. 21, 2023

(54) COMPRESSED AIR-DRIVEN TOOL

(71) Applicant: Otto Suhner AG, Brugg (CH)

(72) Inventors: Stefan Wiedemeier, Brugg Aargau (CH); Stefan Ineichen, Niederlenz Aargau (CH)

(73) Assignee: SUHNER Schweiz AG, Lupfig (CH)

( * ) Notice: Subject to any disclaimer, the term of this patent is extended or adjusted under 35 U.S.C. 154(b) by 429 days.

(21) Appl. No.: 16/623,120

(22) PCT Filed: Jun. 19, 2018

(86) PCT No.: PCT/EP2018/066213
§ 371 (c)(1),
(2) Date: Dec. 16, 2019

(87) PCT Pub. No.: WO2018/234289
PCT Pub. Date: Dec. 27, 2018

(65) Prior Publication Data
US 2020/0215677 A1    Jul. 9, 2020

(30) Foreign Application Priority Data

Jun. 22, 2017 (CH) .................................. 00815/17
Jun. 14, 2018 (CH) .................................. 00758/18

(51) Int. Cl.
*B25F 5/00* (2006.01)
*F01D 15/06* (2006.01)
(Continued)

(52) U.S. Cl.
CPC ............ *B25F 5/001* (2013.01); *B24B 23/026* (2013.01); *B24B 23/028* (2013.01); *F01D 15/06* (2013.01);
(Continued)

(58) Field of Classification Search
CPC ........ F01D 17/141; F01D 15/06; B25F 5/001; G05D 13/62
See application file for complete search history.

(56) References Cited

U.S. PATENT DOCUMENTS 6,908,277 B2    6/2005  Jacobsson
9,603,675 B2    3/2017  Pruckner
(Continued)

FOREIGN PATENT DOCUMENTS

EP    2449999    5/2012
EP    2589745    5/2013
(Continued)

*Primary Examiner* — Richard A Edgar
(74) *Attorney, Agent, or Firm* — Volpe Koenig

(57) ABSTRACT

A compressed air-driven tool having an electromagnetically operated control element (27) for controlling a pneumatic control circuit in order to maintain a load-independent torque at a constant rotational speed. The tool includes a principal valve (5), which arranged in a drive housing (1) in a manner displaceable by the supplied compressed air against the force of a helical spring (13), and a generator (43), which is mounted on the shaft (49) of a turbine wheel (51). The rotational speed of the shaft (49) is measured with a speed sensor (75) and the supply of compressed air to the principal valve (5) is controlled in the event of a drop in rotational speed as a consequence of a load.

14 Claims, 12 Drawing Sheets

(51) Int. Cl.
*F01D 15/10* (2006.01)
*F01D 17/14* (2006.01)
*G05D 13/62* (2006.01)
*B24B 23/02* (2006.01)

(52) U.S. Cl.
CPC ........... *F01D 15/062* (2013.01); *F01D 15/10* (2013.01); *F01D 17/141* (2013.01); *G05D 13/62* (2013.01)

(56) References Cited

U.S. PATENT DOCUMENTS 9,784,289 B2 10/2017 Rothenwaender et al.
2012/0318544 A1 12/2012 Sun et al.

FOREIGN PATENT DOCUMENTS

EP 2727552 5/2014
WO 02052127 7/2002
WO WO-2004035993 A1 * 4/2004 ............. F01D 17/06

* cited by examiner

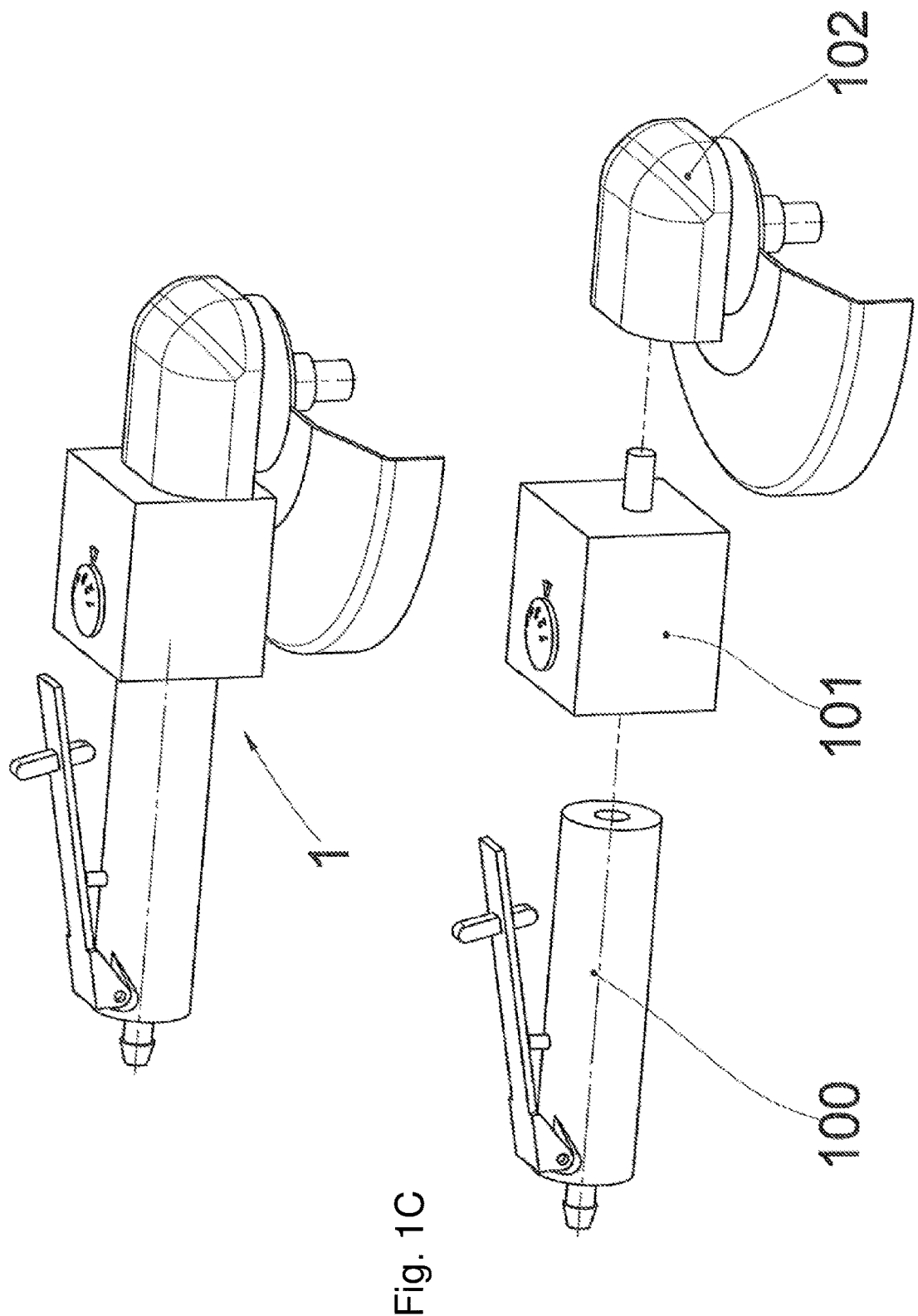

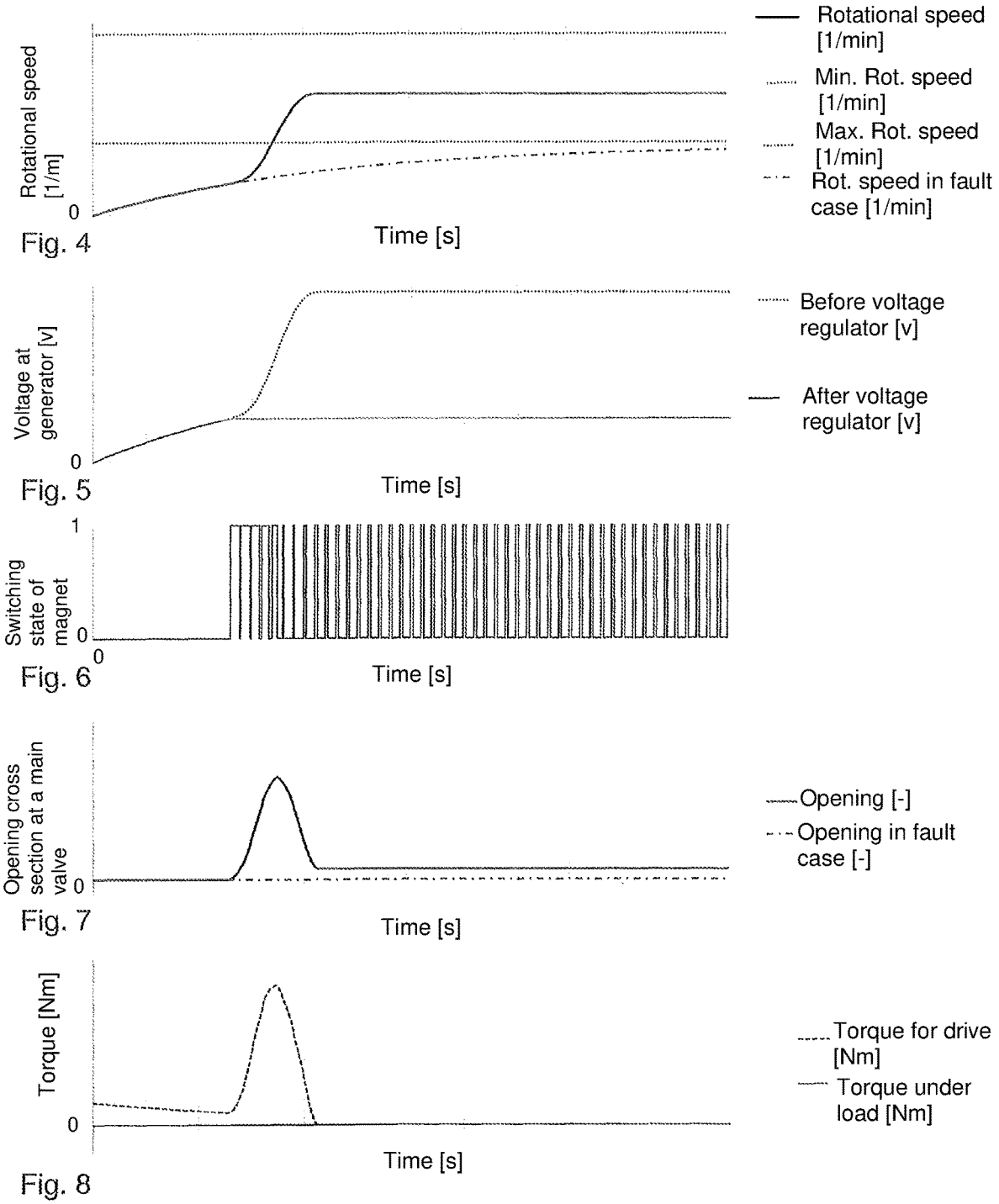

Load case
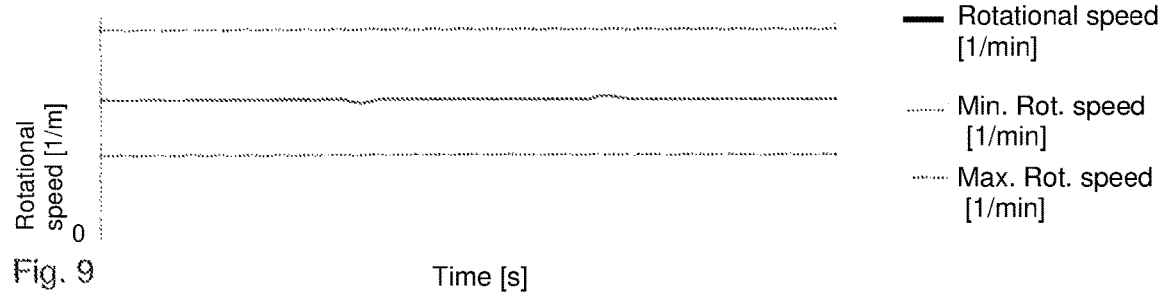
Fig. 9
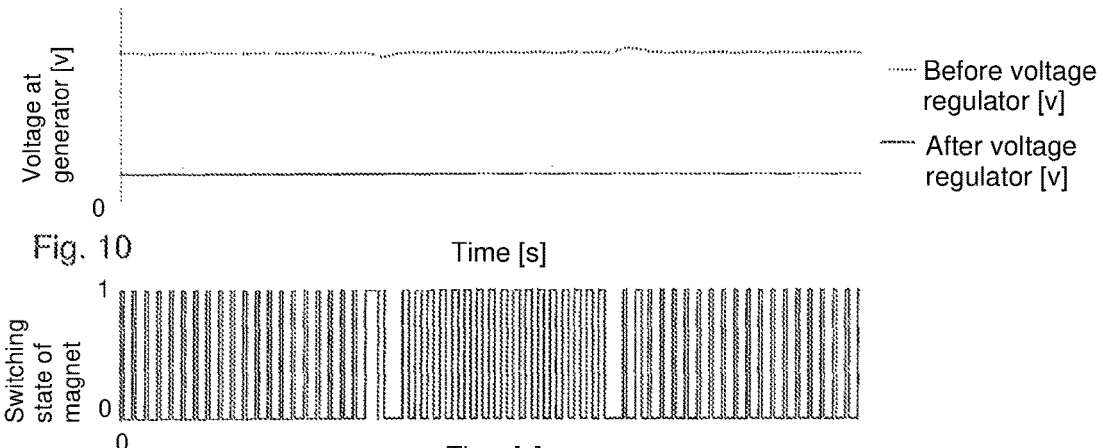
Fig. 10
Fig. 11
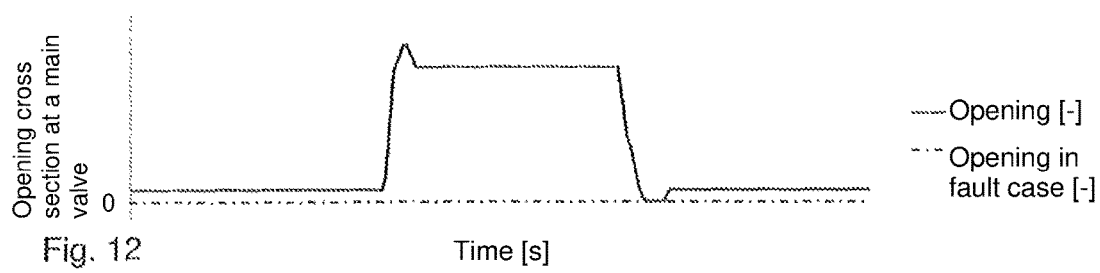
Fig. 12
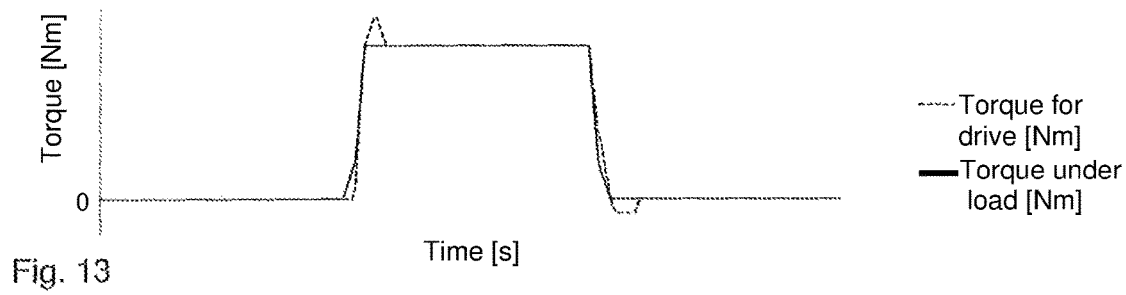
Fig. 13

COMPRESSED AIR-DRIVEN TOOL

TECHNICAL FIELD

The invention relates to a compressed air-driven tool.

BACKGROUND

Compressed air-driven tools are used primarily in the metal-processing industry and are distinguished by a relatively low weight in relation to the power, since no drive motor, such as an electric motor, is arranged within the tool and, in particular in the case of hand-operated tools, leads to rapid fatigue of the operator.

The rotational speed regulation for such tools is complex and has hitherto been performed by centrifugal force regulators which, in the idle state, throttle the supply of air and, under loading, open it up again. The currently required reliability and the maintenance of constant rotational speed in the case of changing work processes and conditions cannot be achieved.

In U.S. Pat. No. 6,908,277, a description is furthermore given of a rotational speed regulator for a rotating compressed-air motor. In the case of said rotational speed regulator, there is arranged on the shaft of the tool a generator which, in a manner dependent on the rotational speed of the shaft, generates a correspondingly variable output voltage. An electromagnetic adjustment element is fed with the respective output voltage in order to control the inlet valve for compressed air at the tool in a manner directly dependent on the output voltage. In this known embodiment, the centrifugal force element is replaced by an electromagnetic actuated adjustment element. That is to say, for the actuation of the electromagnetic adjustment element, a voltage is generated within the tool, with the result that said adjustment element manages without an external current source.

A disadvantage of this rotational speed regulation is the fact that the regulation of the working rotational speed is dependent on the variable voltage which is generated by the motor shaft. This means that the maintenance of the rotational speed of the tool, in particular in the case of variable load, is not possible or is possible only to an insufficient extent.

A fluid-powered medical, in particular dental, hand grip is known from EP 2 449 999. The determination of the actual value of the rotational speed is realized via the amplitude of the rectified generator voltage (analog), and the adjustment element is designed as a proportional valve or as a throttle. This procedure is adequate for fluid drives in the medical sector, in the case of which it is necessary for very low torques to be generated, but not for tools of the metal-processing industry.

A pneumatically powered hand tool in which, via an internal battery and a microcomputer, it is possible for an electromagnetic valve to be controlled directly in the supply-air duct is furthermore known from US 2001/0088921. The battery is fed by a generator in the waste-air stream, the generated energy of which generator is not sufficient for the actuation of an electromagnetic valve.

A further medical handpiece in which, for the purpose of control, use is made of an electrical energy source such as a constant-current source and/or a constant-voltage source, that is to say an external current source, is known from EP 2 727 552. A current connection which is intended to be avoided by the tool according to the invention is indispensable here.

SUMMARY

An object of the present invention is the provision of a compressed air-driven tool, for which the set rotational speed is able to be set exactly to a settable value even under the influence of disturbance variables such as load.

A further object of the invention is the immediate drop in the rotational speed to a non-hazardous value which is minimal for the tool and the workpiece in the event of the current being cut off due to failure of the internal generator.

This object is achieved by a compressed air-driven tool having one or more features of the invention. Advantageous configurations of the tool are described below and in the claims.

A voltage regulator makes it possible for a constant output voltage for feeding a microcontroller to be generated independently of the present variable rotational speed, adapted to the work to be performed, of the shaft. Consequently, it is thus possible, in a manner dependent on the measured rotational speed of the motor and independently of the load of the tool, for the electromagnetic control element to control the air passage at the inlet valve and for the selected rotational speed to be maintained in the case of variable load. The internally generated voltage serves only for feeding the microcontroller and the inlet valve.

BRIEF DESCRIPTION OF THE DRAWINGS

The invention will be described in more detail on the basis of two illustrated exemplary embodiments. In the figures:

FIG. 1B shows a schematic illustration of a compressed air-operated tool, an angle grinder being used in the example, FIG. 1C shows an exploded view of the compressed air-operated tool in the form of the angle grinder of FIG. 1B, FIG. 4 shows a graphical illustration of the rotational speed profile at the shaft with and without rotational speed regulation during the start process, FIG. 5 shows a graphical illustration of the voltage at the generator along a time axis during the start process, FIG. 6 shows a graphical illustration of the activation state of the electromagnet with respect to the time axis during the start process, FIG. 7 shows a graphical illustration of the opening cross section of the main valve during the start process, FIG. 8 shows a graphical illustration of the torque profile during the start process, FIG. 9 shows a graphical illustration of the rotational speed profile at the shaft with and without rotational speed regulation under load, FIG. 10 shows a graphical illustration of the voltage at the generator along the time axis under load, FIG. 11 shows a graphical illustration of the activation state of the electromagnet with respect to the time axis under load, FIG. 12 shows a graphical illustration of the opening cross section of the main valve under load, FIG. 13 shows a graphical illustration of the torque profile under load.

DETAILED DESCRIPTION

Figure 1A:
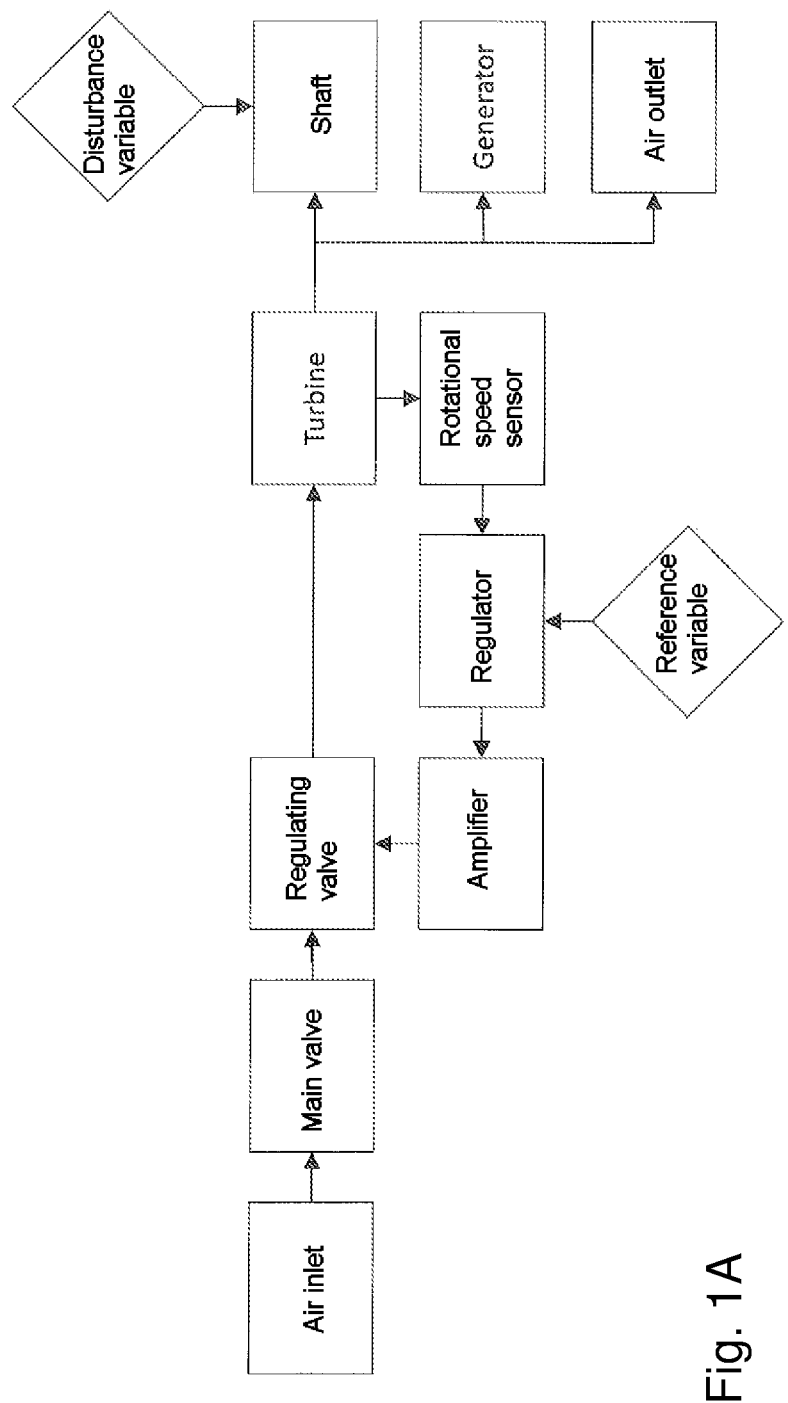
FIG. 1A shows a functional diagram of the tool operated with compressed air.

FIG. 1A illustrates a functional diagram of a compressed air-driven tool according to the invention, one of which is illustrated for example in FIGS. 1B and 1C. FIG. 1B shows an angle grinder as a compressed air-operated tool. In FIG. 1C, the angle grinder is split into its elements in an exploded view, specifically into the first housing part 100 with the air inlet and the actuation lever, and the second housing part 101 with the electronics and the tool head 102, a grinding disk (not illustrated) being able to be fastened to the latter. In place of the angle grinder head, it goes without saying that an output spindle with a straight design may also be fitted. For the purpose of illustrating the functional diagram, two exemplary embodiments are described in more detail in FIGS. 2A to 2C and 3A to 3C.

A schematic illustration with reference sign 1 is given of the drive housing with the drive elements of the compressed air-driven tool. One possible construction of the tool is illustrated in FIG. 1B. Different tool types can be connected by such drive elements. The first housing part 101 comprises an air inlet duct 3, through which air is supplied from a compressed-air source (not illustrated) and which leads to a main valve 5. The latter is axially guided in a bore 7 which forms a stroke space. The main valve 5 comprises a circular ring-shaped first sealing region 9 and, axially spaced apart therefrom, a second piston-like sealing region 11, wherein both sealing regions 9 and 11 are sealingly guided on the wall of the bore 7. The sealing elements at the sealing regions 9, 11 are, for the sake of greater clarity, not illustrated and, moreover, are known from pneumatic valves from the prior art. The air inlet duct 3 opens into the bore 7 between the two mutually opposing shoulders 9' and 11' of the two sealing regions 9, 11. Preferably, in the region of the mouth of the air inlet duct 3, the bore 7 is radially widened as an encircling ring-shaped groove 65, so as to distribute over the entire periphery of the bore 7 the air stream which enters. A helical spring 13 bears with axial action with its first end against the second sealing region 11. The second end of said helical spring is supported against the right-hand end of the bore 7 in the foot space 14. The main valve 5 is pushed against the first end of the head space 17 of the bore (on the left in the figure) by the helical spring 13 as long as no, or only an extremely small amount of, compressed air flows in through the air inlet 3. The sealing region 9, which is situated on the left-hand side in the figures, is situated so as to be kept spaced apart from the rear end of the head space 17 of the bore 7 by a disk-shaped end region 15. A first venting duct 19 leads from the spaced-apart region, that is to say the ring-shaped head space 17, to a valve space 21. A second venting duct 23 leads from the valve space 21 to the outside, that is to say out of the housing 1. The bore 7 for the main valve 5 is, via a pressure duct 25, furthermore likewise connected to the valve space 21. The pressure duct 25 opens into the ring-shaped groove 65. In the valve space 21, there is arranged a regulating valve 27 as a control element, for example a lever-like valve body which is pivotable about an axis 29 and has two sealing elements 28, 30 which are intended to bear alternately against the ends of the pressure ducts 23, 25. The regulating valve 27 comprises a first end 27', having the sealing element 28, and a second end 27", having the sealing element 30. According to the pivoting position of the regulating valve 27, the second venting duct 23 can be closed off by way of the first end 27' or the pressure duct 25 can be closed off by way of the second end 27". A spring element 31, which may be formed by a helical spring engaging at the first end 27' or by a disk spring assembly, forces the second end 27" upward and closes off the pressure duct 25 with respect to the valve space 21. The regulating valve 27 can be pivoted about an axis 29 counter to the force of the spring element 31 by way of an electromagnet 33 such that the pressure duct 25 is opened up and the second venting duct 23 is closed off. The winding 35 of the electromagnet 33 is fed from a current source via a microcontroller 37. Connected to the microcontroller 37 is for example a potentiometer 39, by way of which it is possible to activate the magnet 33 of the voltage at the winding 35 via the lines 41. When the magnet 33 is in a deenergized state, the pressure duct 25 is kept closed off with respect to the valve space 21, with the result that no build-up of pressure occurs in the head space 17 and consequently the main valve 5 prevents the supply of air to a turbine wheel 51, which supply of air is necessary for the drive.

The build-up of an operating voltage for the microcontroller 37 is realized in the supply air stream via a generator 43 whose windings 45 can be fastened for example to the housing 1 and interact with a rotor 47. The rotor 47 is arranged on the shaft 49 of the turbine wheel 51. The turbine wheel 51 is supported by at least one bearing 53 on the housing 1. From the generator 43, the alternating-current voltage generated there is fed to a rectifier 55. The rectifier 55 is furthermore connected to a voltage regulator 57, which feeds the microcontroller 37 with a constant direct-current voltage which is independent of the present rotational speed of the shaft 49 of the turbine wheel 51. The turbine wheel 51 may, as illustrated in the figures, be arranged directly on the output shaft 49 of the tool or in a bypass at the supply duct 61 for compressed air to the turbine wheel 51 (not shown).

The turbine wheel 51, with its blades 59 (not illustrated in detail, but purely schematically), is driven by the supply air stream which is conducted through the supply duct 61. The supply duct 61 is connected to the bore 7 in the housing 1. The mouth of the supply duct 61 into the bore 7 is situated in a first ring-shaped recess 67 in the bore 7. In addition to the supply duct 61, which opens into the bore 7 from below in the figures, a further supply duct 61' may be led into the blade space 63, in which the blades 59 revolve. The second supply duct 61' opens in an axially offset manner into the bore 7 in the second ring-shaped recess 69. The two ring-shaped recesses 67 and 69 are covered in the unpressurized region, that is to say without supply of compressed air or with supply of compressed air, said region having a piston-like form.

In the first exemplary embodiment as per FIGS. 2A to 2D, a bevel or a conical portion 71 is formed on an end side on the cylindrical shell of the second sealing region 11. At this point, a narrow ring-shaped passage for the compressed air supplied through the air inlet duct 3 of the bore 7 is thereby provided. This inflowing air passes via the first supply duct 61 to the blades 59 in the blade space 63 and, from there, after passing through the blades 59, through a waste-air duct 73 into the atmosphere. The air stream supplied to the turbine wheel 51 through the first supply duct 61 has the effect that the turbine blade 51 is set in rotation and, in this way, the generator 43 generates a voltage in a manner dependent on the rotational speed of the turbine wheel 51, said voltage being rectified in the rectifier 55 and being kept constant in the voltage regulator 57 independently of the rotational speed of the turbine wheel 51. The microcontroller 37 is fed with this voltage that is kept constant. By way of the output voltage thereof, it is possible for the potentiometer 39 or another corresponding electronic element to activate the electromagnet 33 in order to control the quantity of supply air to the main valve 5.

The functioning of the electronic control of the compressed-air tool as per the first exemplary embodiment will be described below.

Figure 2A:
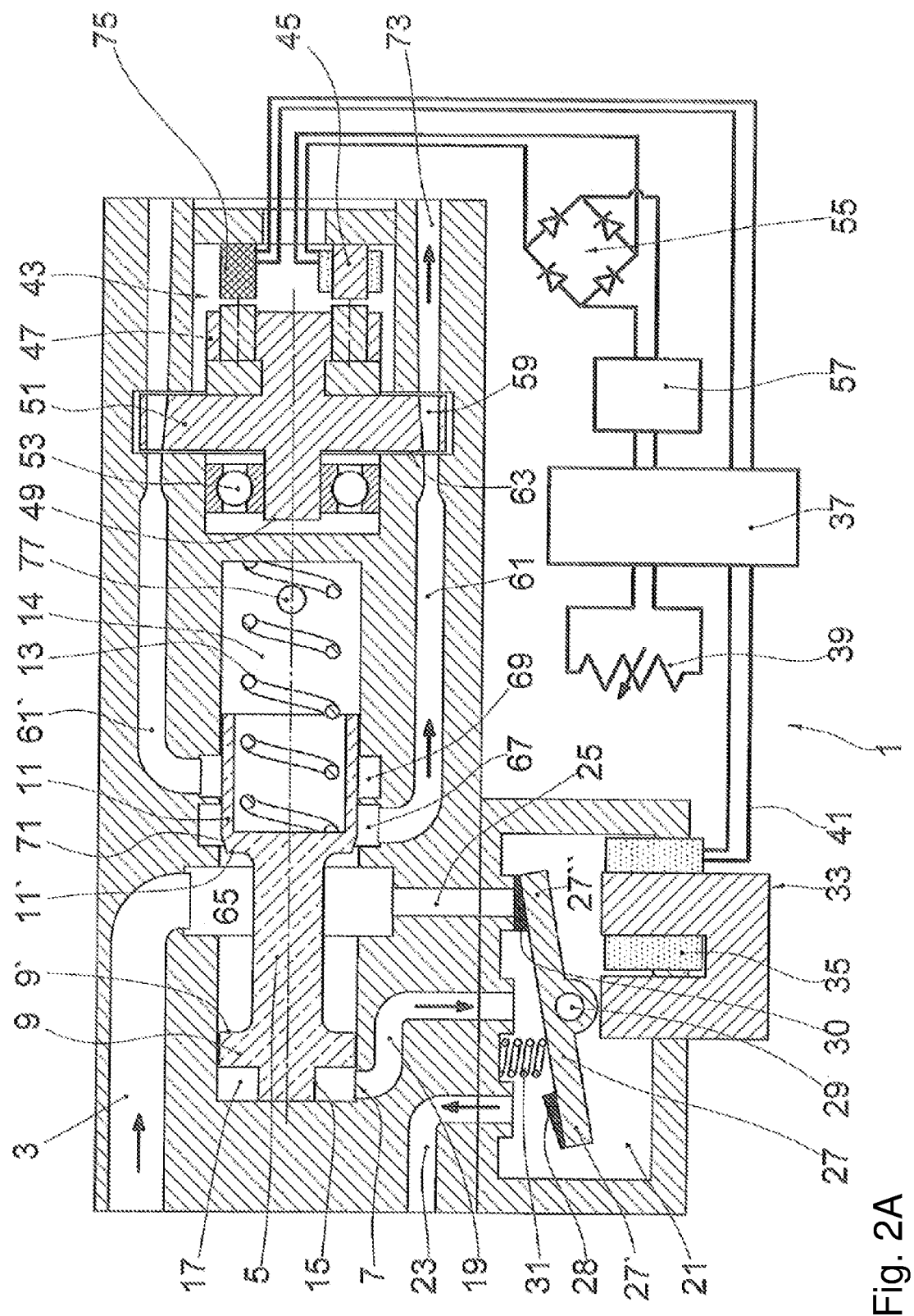
FIG. 2A shows a vertical section through a first embodiment of the tool immediately after the charging with compressed air.
Figure 2B:
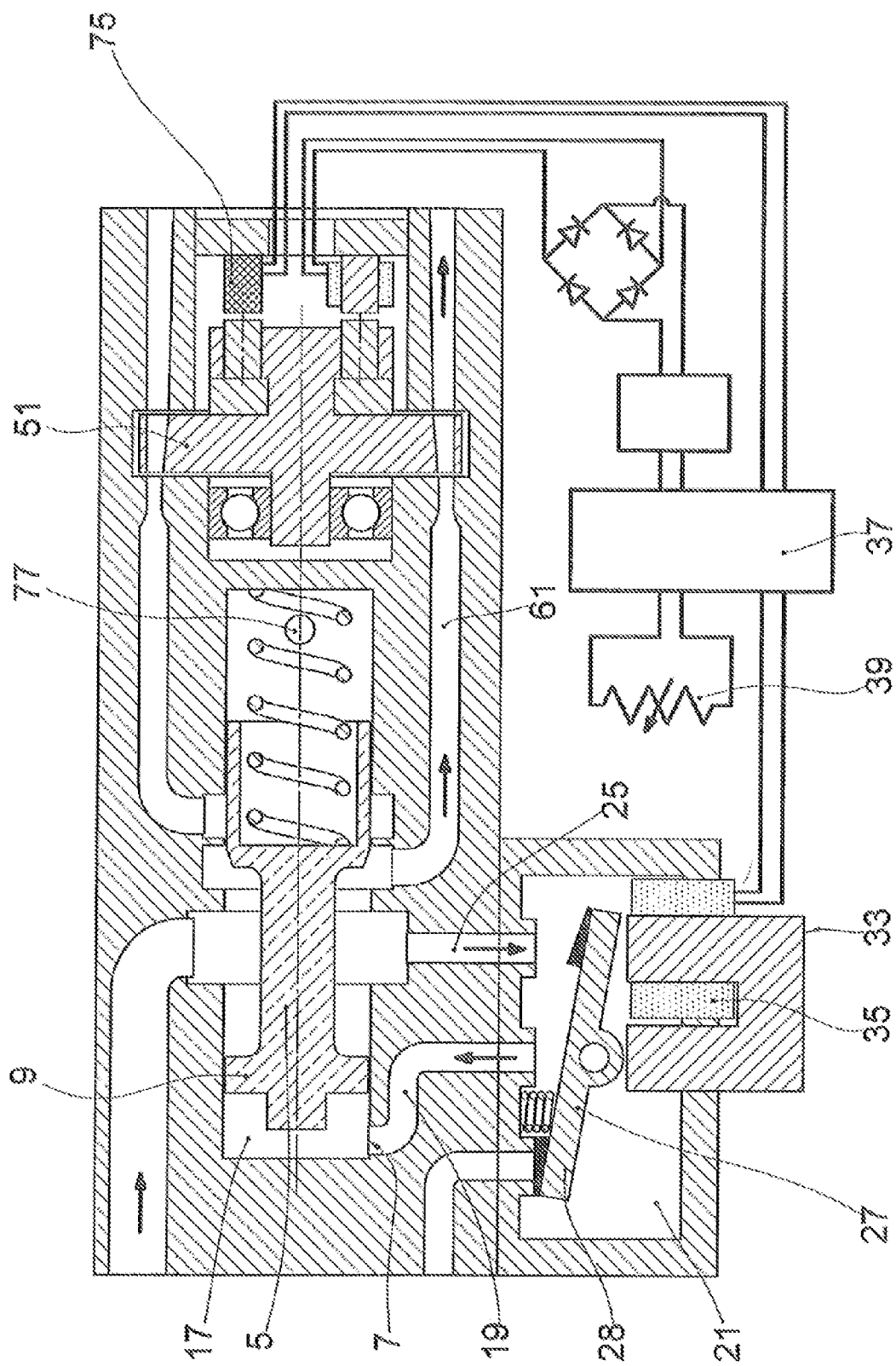
FIG. 2B shows the tool as per FIG. 2A during the start-up phase.
Figure 2C:
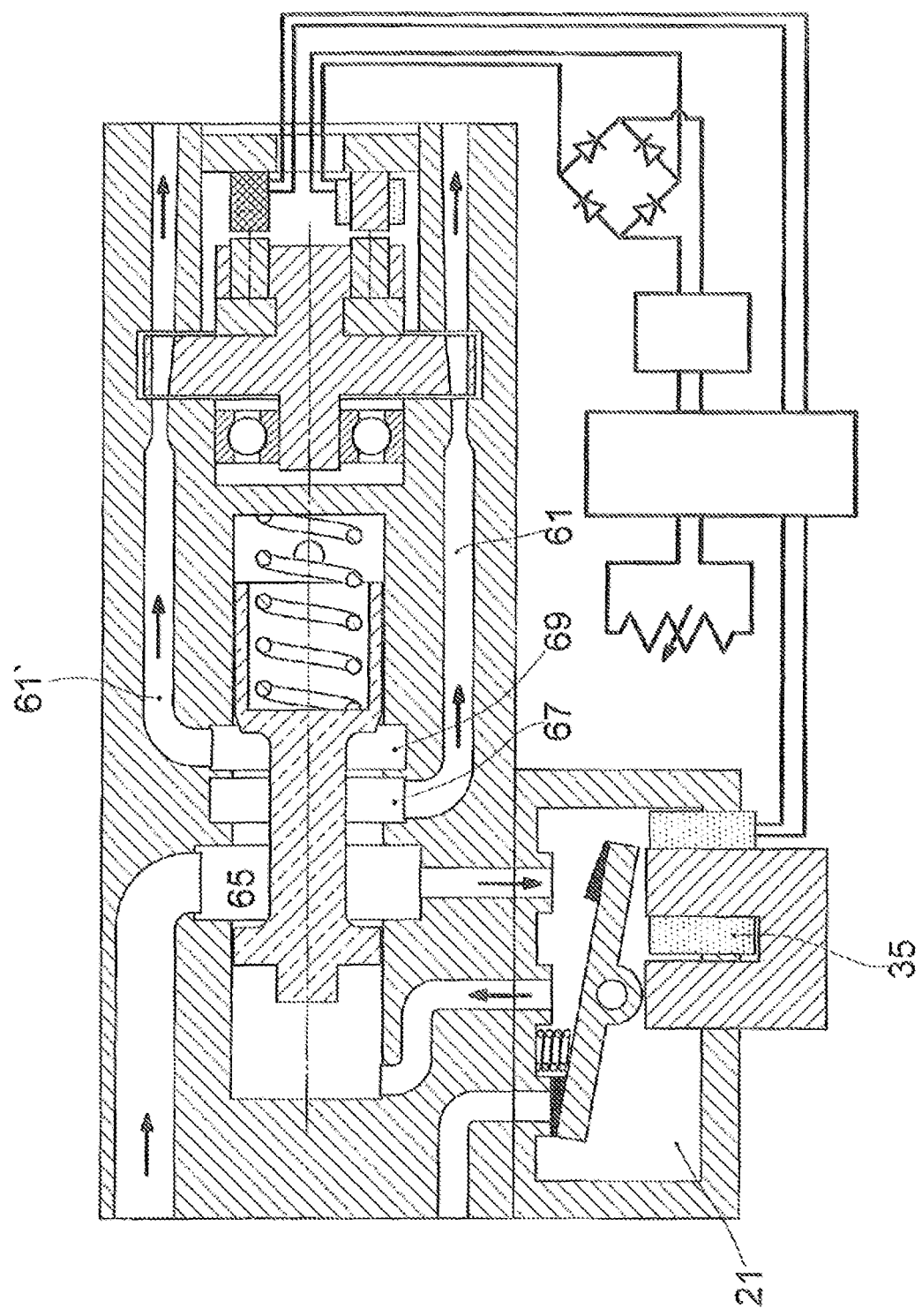
FIG. 2C shows the tool during operation at the highest rotational speed or greatest torque.
Figure 2D:
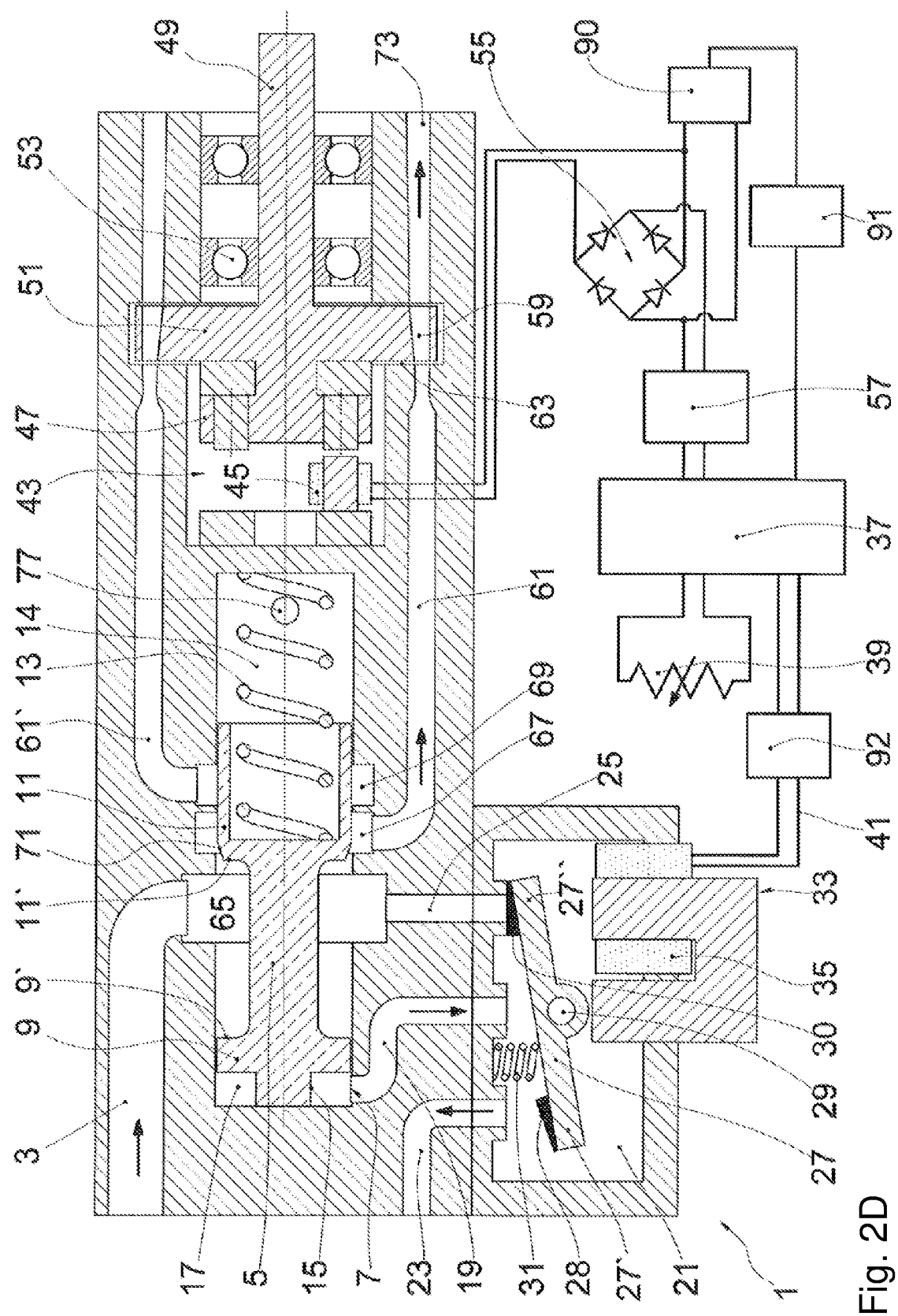
FIG. 2D shows an alternative realization of the rotational speed measurement with an unchanged supply of air in the tool as per FIG. 2A.
Figure 3A:
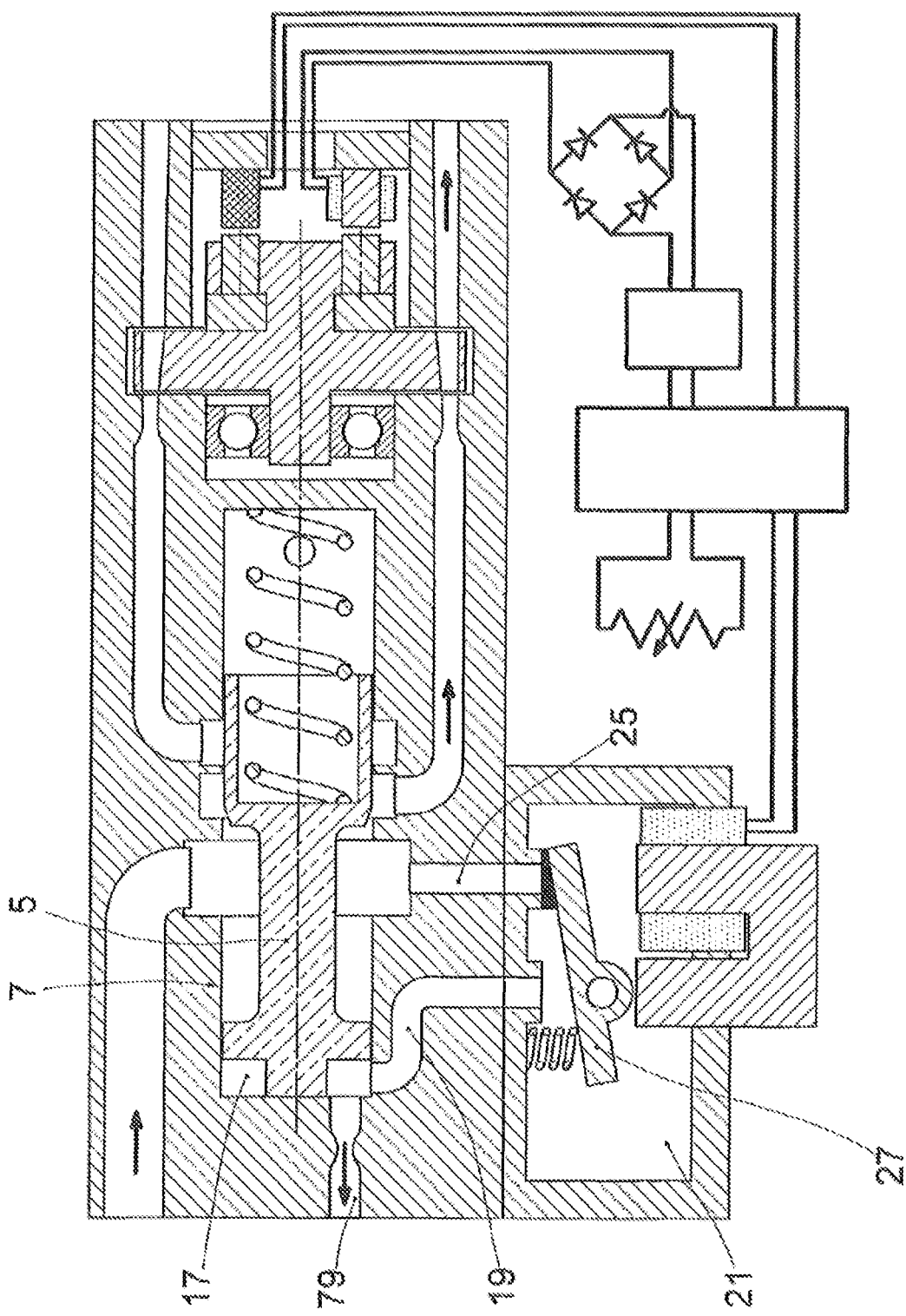
FIG. 3A shows a vertical section through a second embodiment of the tool immediately after the charging with compressed air.
Figure 3B:
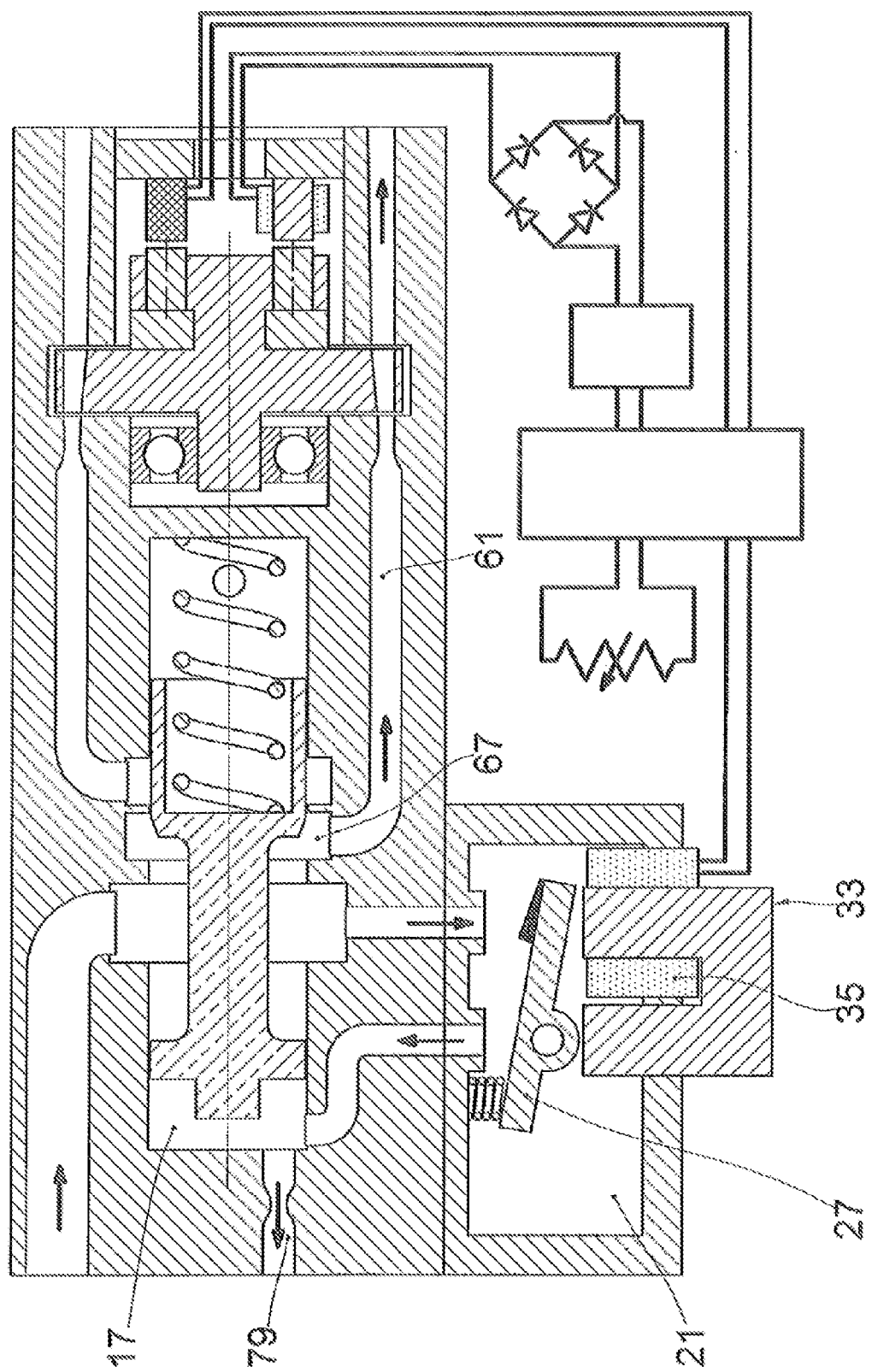
FIG. 3B shows the tool as per FIG. 3A during the start-up phase.
Figure 3C:
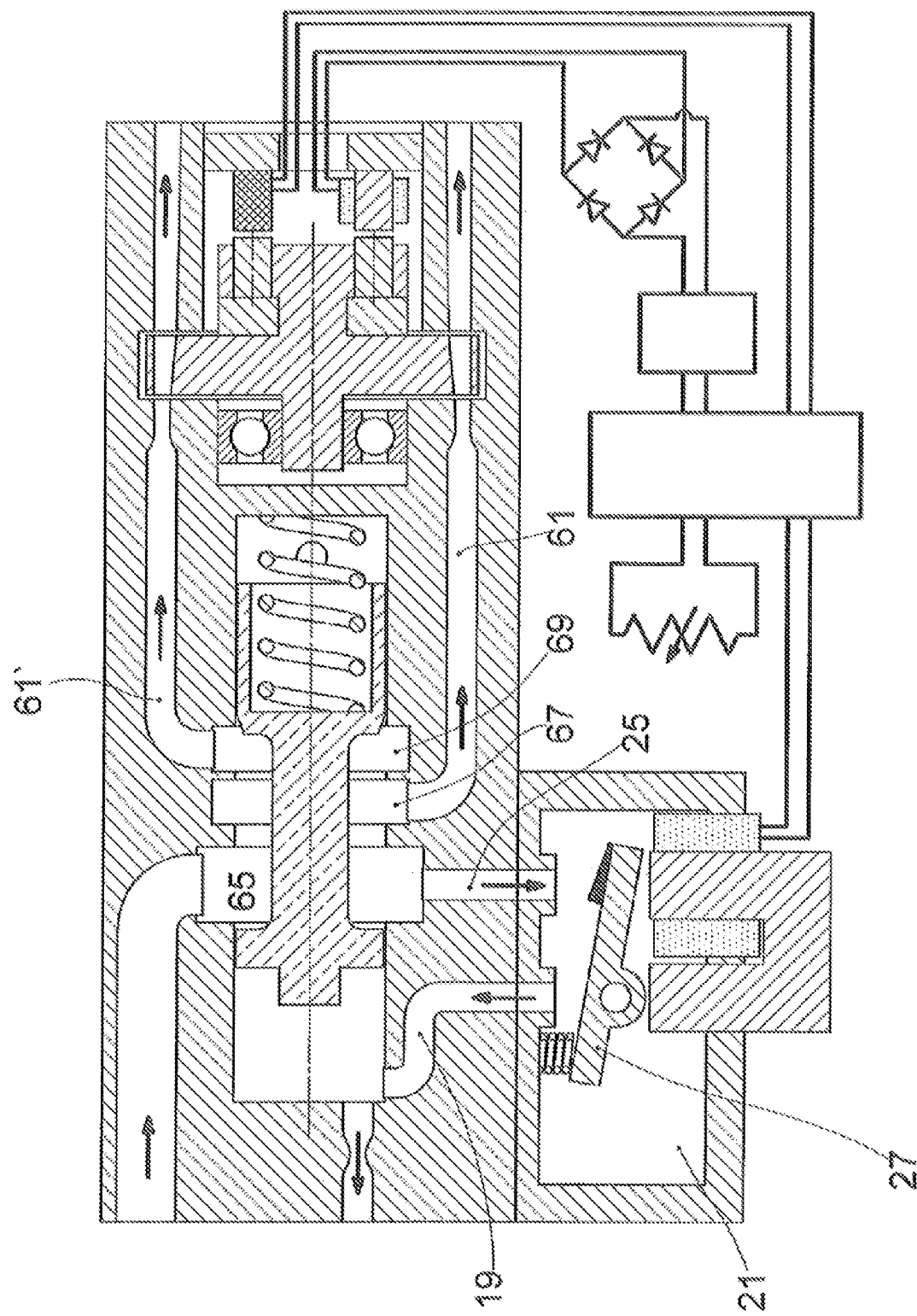
FIG. 3C shows the tool during operation at the highest rotational speed or greatest torque.
Figure 3D:
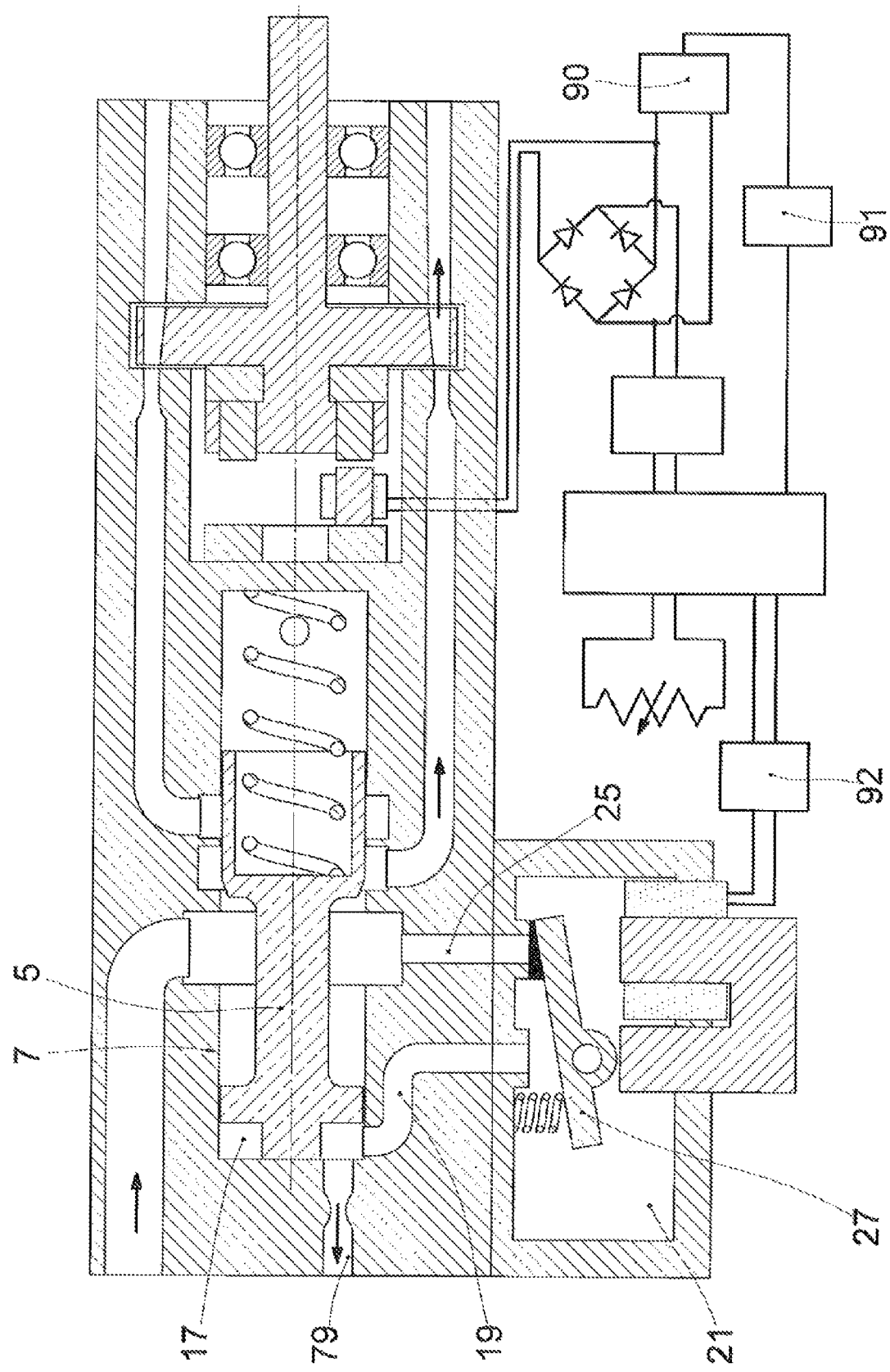
FIG. 3D shows an alternative realization of the rotational speed measurement with an unchanged supply of air in the tool as per FIG. 3A.

Prior to commencing work with the tool, that is to say before compressed air is supplied to the turbine wheel 51 through the inlet duct 3, for example from the operating power supply system, the main valve 5 is situated in the position illustrated in FIGS. 2A and 2D, specifically in abutment with the left-hand end in the bore 7 so as to be acted on by the spring 13. As soon as compressed air is introduced through the air inlet 3, a minimum quantity, formed by the ring-shaped gap, can flow through the conical portion 71 to the first supply duct 61 and set the turbine wheel 51 in rotation (start phase, FIGS. 4-8). This rotational movement of the turbine wheel 51 is sufficient for the application of the required minimum voltage at the microcontroller 37. Here, the main valve 5 remains in the starting position as per FIGS. 2A and 2D even if the pressure between the first and second sealing regions 9, 11 has reached the supply system pressure. The position of the main valve 5 thus persists independently of the pressure in the ring-shaped space 65 as a consequence of the projected cross-sectional surfaces 9', 11' of the two sealing regions 9, 11 being of equal size and the head space 17 being connected to the atmosphere.

The space 14 in the bore 7, in which the helical spring 13 is arranged, is kept unpressurized or at atmospheric pressure by a venting opening 77 which is connected to the atmosphere. The ring-shaped head space 17 behind the first sealing region 9 is, at this time, connected via the first venting duct 19 to the valve space 21 and via the second venting duct 23 likewise to the atmosphere, and is unpressurized. The pressure duct 25, which leads from the bore 7 into the valve space 21, is closed off by the regulating valve 27, or the sealing element 30 thereof, at the second end 27". As soon as the operating voltage $V_1$ required for the operation of the microcontroller 37 has been reached, the rotational speed preset by the potentiometer 39 can be attained by activation and deactivation of the electromagnet 33. The rotational speed is measured by a suitable rotational speed sensor 75 on the shaft 49. The activation and deactivation of the electromagnet 33 brings about, in an alternating manner, the opening and closing of the pressure duct 25 and of the second venting duct 23, and consequently oscillation of the regulating valve 27. The charging of the main valve 5 with compressed air that is consequently brought about is described below. If a load is then applied to the shaft 49, then the rotational speed initially drops. In order to be able to compensate this, that is to say to increase the torque in order to maintain the desired rotational speed, the regulating valve 27 is pivoted clockwise by way of the microcontroller 37 by corresponding activation of the electromagnet 33, whereby compressed air can flow from the air inlet 3 via the ring-shaped groove 65 through the pressure duct 25 into the valve space 21 and, from there, further through the first venting duct 19 into the ring-shaped space 17 behind the first sealing region 9 (FIG. 2a). In this way, the main valve 5 charged with compressed air at an end side is displaced to the right counter to the force of the helical spring 13. It is then possible for the compressed air to pass from the bore 7 to the turbine wheel 51 not only through the first supply duct 61, but rather, as per FIG. 2c, the second ring-shaped duct 69 is also charged with compressed air, through which second ring-shaped duct the compressed air flows into the second supply duct 61'. The turbine wheel 51 is then acted on by a greater quantity of compressed air, whereby the torque on the shaft 49 is increased. In practice, this is achieved in that the regulating valve 27 performs a rotary oscillation and thus adapts the compressed air supplied to the rear end of the first sealing region 9 to the required torque. This may be the case multiple times per second (cf. FIG. 6).

The second configuration of the pressure-driven tool as per FIGS. 3A-3D differs from the first exemplary embodiment in that the ring-shaped head space 17 is, with the interposition of a throttle 79, connected to the atmosphere at the rear end of the first sealing region 9. In this configuration, the regulating valve 27 is consequently active only on one side and can open or close the pressure duct 25 toward the valve space 21. Opening of the pressure duct 25 results in compressed air flowing from the bore 7 into the valve space 21 and, from there, through the first venting duct 19 into the ring-shaped head space 17. A part of the compressed air conducted into the ring-shaped space 17 can escape in a throttled manner, with the result that the force acting on the main valve 5 is smaller than in the first exemplary embodiment.

In practice, it is expedient for use to be made of a larger regulating valve for the second configuration variant, in order to be able to compensate for the constant waste-air stream brought about by the throttle.

Illustrated in the graphical illustrations in FIG. 4 are, illustrated with broken lines, the rotational speed profile without electronic control, that is to say during the start process and also in the event of failure of the generator 43 and, with a solid line, the profile of the rotational speed on the time axis. It can clearly be seen that, in the start phase, the rotational speed during the build-up of the supply system pressure the pressure in the bore 7 between the two sealing regions 9 and 11 rises, and then, for example after 1.5 seconds, when the voltage of the generator 43 has reached for example 5 volts, the rotational speed rises upward more steeply because the regulating valve 27 is pivoted clockwise by way of the electromagnet 33 and the pressure (supply system pressure) built up in the bore 7 can consequently pass through the valve space 21 into the first venting duct 19 and, from there, into the ring-shaped head space 17. The pressure increase in the head space 17 brings about a displacement of the main valve 5 to the right counter to the force of the spring 13. Due to the displacement of the main valve 5, compressed air passes from the bore 7 firstly through the first supply duct 61 to the turbine wheel 51 and—in case this additional supply of air to the turbine wheel 51 is not sufficient for attaining the set rotational speed—furthermore through the second supply duct 61' to the turbine wheel 51. As soon as the set rotational speed (5000 revolutions per minute in the example) has been reached, the regulating valve 27 is closed via the microcontroller 37, with the result that, on the rear side of the main valve 5, that is to say on the left-hand side thereof in the head space 17 in FIGS. 2 and 3, the pressure drops and the main valve 5 thus moves back to the left by the force of the spring 13, specifically so far that the set rotational speed is maintained, that is to say is on a horizontal line. The set rotational speed lies between the minimum rotational speed (lower dotted line, for example at 30000 revolutions per minute and the upper dotted line, for example at 75000 revolutions per minute), which must not be exceeded.

In the illustration as per FIG. 5, which shows the dimension of the opening cross section at the main valve 5 over time s, it can be seen that, independent of the charging of the bore 7 with compressed air, a small air flow can at all times pass from the bore 7 to the first recess 67 and, from there, through the first supply duct 61 to the turbine wheel 51 and set the latter in rotation, and the generator 43 consequently generates a voltage, which is kept constant by the voltage regulator 57. The opening of the regulating valve 27 makes it possible for more compressed air to flow through the pressure duct 25 into the first venting duct 19, where a build-up of pressure in the ring-shaped head space 17 is brought about. In this way, the main valve 5 is quickly pushed to the right counter to the force of the spring 13, this leading to an enlargement of the opening cross section, that is to say bringing about an enlarged passage from the bore 7 at least into the first recess 67 and, from there, to the turbine wheel 51. The opening cross section is subsequently immediately reduced again by the microcontroller 37, which regulates the regulating valve 27 on the basis of the rotational speed measured at the shaft 49, in that the supply of compressed air in the ring-shaped head space 17 is reduced. This is carried out until the opening cross section has reached a dimension at which the rotational speed of the shaft is at the set value, for example 50000 revolutions per minute.

The profile of the voltage at the generator 43 is illustrated in FIG. 5. The solid line shows that the voltage, at the beginning, after the activation of the compressed air, rises successively, and is constant for example after approximately 1.5 seconds upon attainment of the voltage of 5 volts set at the voltage regulator 57. If the voltage due to higher rotational speed at the shaft 49 were not kept constant by the voltage regulator 57, the voltage would rise with rotational speed for example up to approximately 25 volts and consequently damage, or at least put out of operation, the microcontroller 37.

FIG. 6 graphically illustrates the switching state of the regulating valve 27. At the beginning, in the start phase, when the regulating valve 21 keeps closed the supply of compressed air to the main valve 5 because the electromagnet 33 is still free of voltage from the generator 43, said regulating valve remains in the starting position. As soon as, as illustrated in FIG. 5, the voltage at the generator 43 has reached for example 5 volts, the regulating valve 27 switches to the open position because it is pivoted clockwise by the electromagnet 33. Were the regulating valve 27 kept permanently in the open position, then, as illustrated in FIG. 1, the rotational speed would rise beyond the desired or set rotational speed and possibly beyond the maximum rotational speed. The set rotational speed can be maintained by way of oscillating behavior of the regulating valve 27 as per FIG. 6.

FIGS. 9 to 13 show the profile of the rotational speed of the shaft 49, the direct-current voltage after the voltage regulator 57 and the switching state of the electromagnet 33, where it can clearly be seen in FIG. 11 that, in the case of a drop in rotational speed at the shaft 49, for example due to a corresponding active load, the supply of compressed air into the head space 17 of the main valve by way of the regulating valve 27 is open for longer than in the case of unchanged rotational speed, in order to compensate for the drop in rotational speed, and subsequently the opening and closing for the supply of pressure is realized according to a changed rhythm.

FIG. 12 illustrates at the point of the loading of the shaft 49 how the opening cross section for at least one of the supply ducts 61, 61' is briefly enlarged and then, over a specific time, as long as a higher torque is required, is kept at this increased cross section until the load is removed and the rotational speed or the torque can be reduced. The torque profile can be correspondingly seen in FIG. 13.

The measurement of the rotational speed is realized as per FIGS. 2A, 2B and 3A, 3B by the sensor 75, which is designed as a Hall sensor as a separately arranged part. In the embodiment as per FIGS. 2D and 3D, the rotational speed measurement is realized on the basis of the alternating current signal of the generator 43, in that the rising flanks of the alternating current signal are detected and the rotational speed is calculated from the time difference.

The invention claimed is:

1. A method for regulating a rotational speed of an output shaft (49) at a tool which is driven with compressed air, the method comprising:
    using a generator (43) driven by the compressed air, in the tool, and generating an alternating-current voltage;
    activating an electromagnetic regulating element (27) using the alternating-current voltage by which a quantity of air for the drive of a turbine wheel (51) on the output shaft (49) is regulated,
    converting the alternating-current voltage into a direct-current voltage in a rectifier (55),
    maintaining the direct-current voltage constant using a voltage regulator (57) independently of the rotational speed of the output shaft (49),
    feeding a microcontroller (37) with the constant direct-current voltage, measuring a present value of the rotational speed of the output shaft (49) using a rotational speed sensor (75), and
    the microcontroller (37) regulating, by way of the electromagnetically driven regulating valve (27), the quantity of air supplied to the turbine wheel (51) and keeping a set predefined rotational speed of the shaft (49) constant.

2. The method as claimed in claim 1, further comprising using the quantity of air regulated by the regulating valve (27) to control a main valve (5) which is displaceably inserted in a bore (7) in the housing (1) of the tool to regulate the inflow of air to the turbine wheel (51) by completely or partially opening up one or more supply ducts (61, 61') for the compressed air during the displacement of the main valve (5), and the quantity of air at the turbine wheel (51) is increased in case of an increase in load at the output shaft (49) and the predefined rotational speed is maintained.

3. A compressed air-driven tool comprising:
    a drive housing (1) which includes a turbine wheel (51) that drives an output shaft (49),
    an air inlet duct (3) for compressed air, a waste-air duct (73), a generator (43) inserted in a supply air path for the compressed air that is adapted to generate an electrical alternating-current voltage, a rectifier (55) that is configured to convert the electrical alternating-current voltage to a direct-current voltage, a microcontroller (37), a rotational speed sensor for the output shaft, and a voltage regulator configured to generate a constant output voltage, which is independent of a rotational speed of the shaft (49), for operation of the microcontroller (37) which is configured to control a control element (27) for the actuation of a main valve (5) based on measurement data of the rotational speed sensor (75) for the output shaft (49).

4. The compressed air-driven tool as claimed in claim 3, wherein the generator (43) is arranged on the output shaft (49) or on a second shaft, which is independent of the output shaft (49), in a bypass.

5. The compressed air-driven tool as claimed in claim 4, further comprising a bore (7) that accommodates the main valve (5) formed in the drive housing (1), the bore (7) is formed so as to be connectable by an air inlet (3) to a compressed-air source, and the bore (7) is connected by a pressure duct (25) and by a first venting duct (19) to a valve space (21), and the control element comprises an electromagnetically activatable regulating valve (27) for opening and closing the pressure duct (25), or for closing a second venting duct (23), is inserted in the valve space (21), and the regulating valve (27) is configured to be regulated in a manner dependent on the rotational speed of the shaft (49), which is measured by the rotational speed sensor (75).

6. The compressed air-driven tool as claimed in claim 5, wherein the main valve (5) is displaceably guided between a head space (17) and an unpressurized space (14) in the bore (7).

7. The compressed air-driven tool as claimed in claim 5, wherein the valve space (21) is connected by the first venting duct (19) to a bottom-side head space (17) at a bottom of the main valve (5).

8. The compressed air-driven tool as claimed in claim 5, wherein the valve space (21) is connected by the second venting duct (23) to the surroundings.

9. The compressed air-driven tool as claimed in claim 6, wherein the main valve (5) comprises first (9) and second flange-shaped sealing regions (11) that are spaced apart from one another, shell surfaces of which bear slidingly against a wall of the bore (7), and a helical spring (13) inserted in an unpressurized space (14) in the bore (7), the helical spring (13) being inserted between the main valve (5) and a wall delimiting the bore (7) on an end side.

10. The compressed air-driven tool as claimed in claim 9, wherein the first sealing region (9) sealingly guides the main valve (5) on the head side with respect to the bore (7), the second sealing region (11) is arranged such that a first mouth into the bore (7) of a first supply duct (61) is partially closed off, and a mouth of a second supply duct (61') is completely closed off, for the main valve (5) in an unpressurized state on the head space side or the pressure space side.

11. The compressed air-driven tool as claimed in claim 10, wherein at least one of the air inlet duct (3), the first (61), or the second supply duct (61') in each case open into a ring-shaped groove (65) or a first recess (67) or a second recess (69) at the main valve (5).

12. The compressed air-driven tool as claimed in claim 11, wherein the supply ducts (61, 61') open into a blade space (63) of a turbine wheel (51).

13. The compressed air-driven tool as claimed in claim 5, wherein the regulating valve (27) in the valve space (21) is mounted pivotably such that either the pressure duct (25) or the second venting duct (23) is closed off by a sealing element (28, 30) which is actuated by an electromagnet (33) and which is attached to the regulating valve (27).

14. The compressed air-driven tool as claimed in claim 3, wherein the rotational speed measurement is calculated by detecting a time difference in rising flanks of an alternating current signal.

* * * * *